United States Patent [19]

Patroni, Jr.

[11] Patent Number: 4,584,889
[45] Date of Patent: Apr. 29, 1986

[54] DRIVE MECHANISM FOR OCCUPANT PROPELLED VEHICLE AND THE LIKE

[76] Inventor: Anthony F. Patroni, Jr., 9005 Amherst Ave., Margate, N.J. 08402

[21] Appl. No.: 684,781

[22] Filed: Dec. 21, 1984

Related U.S. Application Data

[63] Continuation-in-part of Ser. No. 558,290, Dec. 5, 1983, Pat. No. 4,548,420.

[51] Int. Cl.⁴ .................. B62M 1/14; F16H 21/22
[52] U.S. Cl. .................... 74/49; 280/248; 280/257
[58] Field of Search .............. 74/49, 67, 68, 69, 66; 280/248, 247, 257, 256

[56] References Cited

U.S. PATENT DOCUMENTS

| | | | |
|---|---|---|---|
| 598,026 | 1/1898 | Slippern | 280/234 |
| 3,701,543 | 10/1972 | Clark et al. | 280/234 |

FOREIGN PATENT DOCUMENTS

| | | | |
|---|---|---|---|
| 543761 | 1/1956 | Belgium | 280/248 |
| 160417 | 5/1941 | Fed. Rep. of Germany | 74/49 |
| 862166 | 2/1941 | France | 280/257 |
| 299775 | 2/1929 | United Kingdom | 280/248 |

OTHER PUBLICATIONS

"Mechanical Movements", by H. T. Brown, pp. 26-27 & 84-85, Published 1893.

Primary Examiner—Lawrence J. Staab
Attorney, Agent, or Firm—Robert K. Youtie

[57] ABSTRACT

A drive mechanism for bicycles and other devices, comprising a rotary crank shaft having radial crank arms, oscillatory guides or ways spaced from the axis of the crank shaft, crossheads shiftable in the guides, and connecting rods connected between respective crossheads and crank arms, so that crosshead movement is transmitted to the crank shaft, which may power a vehicle or other device.

7 Claims, 6 Drawing Figures

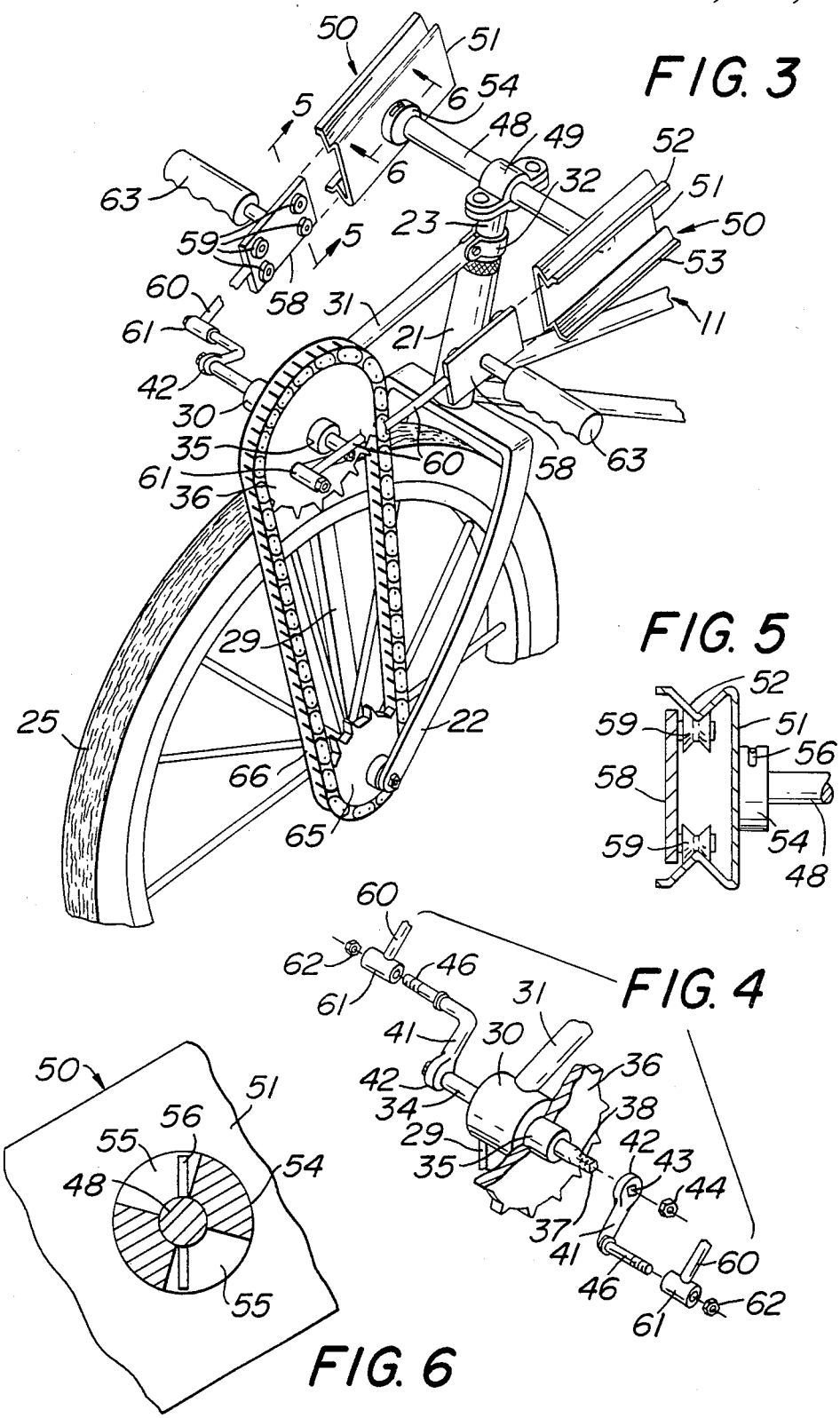

DRIVE MECHANISM FOR OCCUPANT PROPELLED VEHICLE AND THE LIKE

CROSS-REFERENCES TO RELATED APPLICATIONS

This application is a continuation-in-part of copending U.S. patent application Ser. No. 558,290, filed Dec. 5, 1983 now U.S. Pat. No. 4,548,420.

BACKGROUND OF THE INVENTION

The present great popularity of bicycles is largely due to the healthful body exercise achieved by bicycling. While the device of the present invention is shown, for purposes of illustration and understanding, as applied to the front wheel drive of a tricycle and hand operated, it may also be employed as a rear wheel drive and be foot operated, if desired, and is not limited to occupant propelled vehicles, but may be advantageously employed in other environments.

However, as the drive mechanism has been primarily developed and employed as a front wheel drive for an occupant propelled vehicle, the drawing and descriptions herein are directed thereto.

In this regard applicant is aware of the below listed prior patents:

| U.S. PAT. NO. | PATENTEE |
| --- | --- |
| 348,325 | Hamshaw |
| 598,026 | Slippern |
| 3,921,464 | Greseth |
| 4,147,370 | Lindsey, Jr. |
| 2,225,230 | Ott |
| 2,547,600 | Saxer |
| 3,701,543 | Clark et al. |
| 4,189,166 | Lindsey |

SUMMARY OF THE INVENTION

It is among the important objects of the present invention to provide a drive mechanism for an occupant propelled vehicle, or other, which is highly advantageous in producing unique body movements for optimum healthful exercise; which is simple enough in operation to be employed by young children as well as the elderly and handicapped, while having a degree of difficulty conducive to enhancing coordination and skill.

The invention further contemplates provision as original equipment during manufacture, or as after market attachment to existing vehicles.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 3 is a partial front perspective view of the tricycle of FIGS. 1 and 2, partly exploded for clarity of understanding.

FIG. 4 is an exploded, partial front perspective view of the crank shaft and associated components of the instant drive mechanism.

FIG. 5 is a partial transverse sectional view taken generally along the line 5—5 of FIG. 3.

FIG. 6 partial sectional view taken generally along the line 6—6 of FIG. 3.

DESCRIPTION OF THE PREFERRED EMBODIMENT

Figure 1:
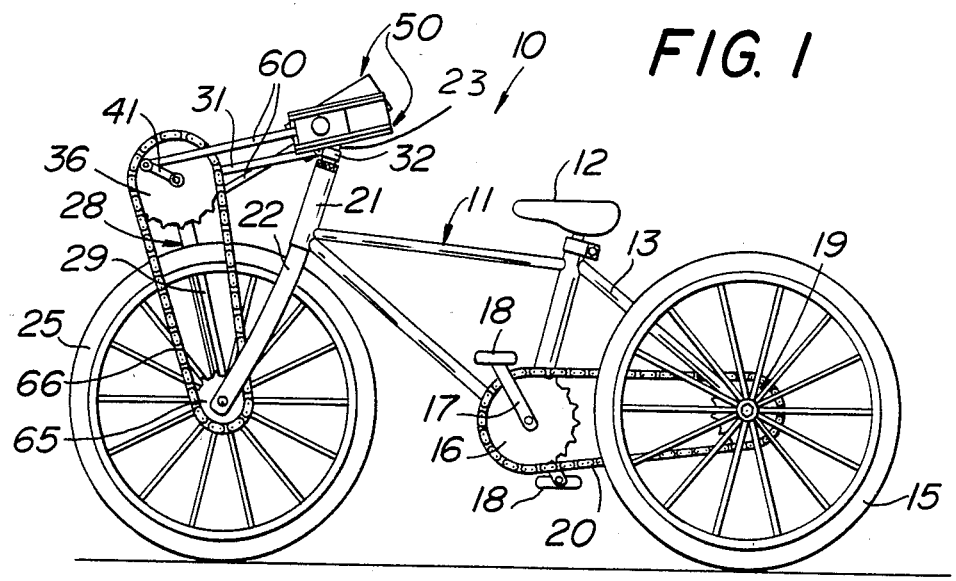
FIG. 1 is a side elevational view showing a tricycle having a conventional foot operated rear wheel drive and including a hand operated embodiment of front wheel drive in accordance with the teachings of the present invention.
Figure 2:
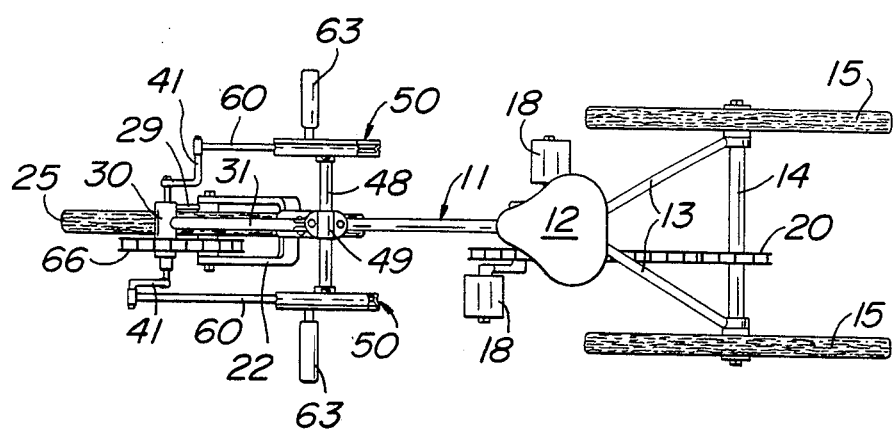
FIG. 2 is a top plan view of the tricycle of FIG. 1

Referring now more particularly to the drawings, and specifically to FIGS. 1 and 2 thereof, an occupant propelled vehicle or tricycle is there generally designated 10, which may include a generally forwardly and rearwardly extending frame 11 having on an upper rear frame region a seat 12. The lower rear frame region may include downwardly and rearwardly diverging frame members 13 rotatably journaling at their lower ends a laterally extending rear axle 14. On opposite ends of the rear axle 14 may be provided a pair of rear wheels 15.

A conventional sprocket wheel 16 is journaled in a lower region of the frame 11, carrying a crank 17 and pedals 18. A rearmost sprocket 19 may be circumposed about and keyed to the rear axle 14; and, a drive element or endless sprocket chain 20 may be trained about both sprocket wheels 16 and 19 for driving the latter from the former in conventional manner.

The frame 11 may include at its forward end a generally upright bearing tube 21 which journals a depending front wheel fork 22 having a post 23 upstanding beyond the upper end of tube 21. A front wheel 25 is interposed between the legs of fork 22 and journaled therein, as by an axle 26 extending between the adjacent lower regions of the fork legs.

A mounting structure or framework is carried by the front wheel fork 22, being generally designated 28, and includes a pair of lower links or struts 29 upstanding in parallelism with each other on opposite sides of the wheel 25 from the lower ends of respective legs of fork 22, being suitably secured thereto, as by the pivot or axle 26. The upper ends of the struts 29 may terminate in a generally horizontal bearing tube or journal 30, for a purpose appearing presently. The tube 30 of the framework 28 is connected by a strut or link 31 to the upstanding post 23 of fork 22, as by a clamp 32, or other suitable means. Thus, the struts 29 and 31 combine with the fork 22 to define a rigid framework or support rotatable about the axis of journal tube 21 upon steering movement of the wheel 25.

The journal tube 30 is generally parallel to the axle 26 of wheel 25, and rotatably supports a crank shaft 34 extending oppositely beyond the ends of tube 30. The crank shaft 34, just outboard of the tube 30, may be provided with a circumposed hub 35 carrying a sprocket wheel 36 for rotation with the crank shaft 34. The crank shaft 34 may have opposite end portions threaded, as at 37, and may be provided inward of the threaded end portions with noncircular regions 38, say of rectangular or square cross-sectional configuration.

Extending radially from each end of the crank shaft 34 is a crank arm 41, which may have its inner end portion 42 provided with a noncircular opening 43 for nonrotatably receiving the noncircular shaft portion 38. A retaining means or nut 44 may be provided on each end of crank shaft 34 to releasably retain the associated crank arm 41 on the shaft. In the illustrated embodiment the crank arms 41 extend radially oppositely with respect to the crank shaft, but they may be arranged to extend in the same radial direction, or in some intermediate relationship, if desired.

Extending from the outer end of each crank or arm 41, generally normally is a crank pin 46, which extend in general parallelism with and offset from the crank shaft 34. Further, the crank pins 46 may be offset from each other, as illustrated, or in alignment, as discussed above.

A transverse steering member or bar 48 is secured to the upper end of fork post 23, and may be secured thereto by any suitable means, such as a clamp 49. The steering member 48 extends on opposite sides of the clamp 49 and post 23, and is provided on opposite ends with outwardly facing channels, guides or ways 50, each extending generally forwardly and rearwardly, transversely of the cross member or bar 48. Each channel or guide member 50 includes an elongate back wall or web 51 secured to the adjacent end of steering member 48, and a pair of generally parallel, longitudinally extending, upper and lower side walls or flanges 52 and 53. Each channel back wall or web 51 may be rotatably mounted to the adjacent end of cross member 48 by a journal or sleeve 54. The sleeve 54 may have diametrically opposed arcuate cut-outs 55; and a cross pin 56 extending through and radially beyond the bar member 48 is captured in each cut-out for limiting rotation of the sleeve 54 and the affixed guide 50. Thus, the guides or channels 50 are mounted for limited oscillatory rotation about the axis of the bar member 48.

A crosshead or shifting member 58 is shiftable in each guide or way 50 and connected to a respective crank pin 46. More specifically, each crosshead 58 may have rollers 59 on its inner side configured for rolling engagement with the specific contours of the channel side walls 52 and 53. For example, the rollers 59 may be of a "V" type, and the channel side walls conformably configured, as seen in FIG. 5. A connecting member or rod 60 may extend from each crosshead 58 in a respective guide or channel 50 forwardly to a transverse sleeve 61. The connecting rod sleeves 61 are each rotatably engaged about a respective crank pin 46 and retained thereon by a nut 62 or other suitable retainer.

Extending laterally outwardly from each crosshead or shiftable member 58 may be a hand actuable member or grip 63. Thus, the hand grips 63 extend outwardly from respective channels 50 for grasping by a user.

Upon actuation of the hand grips 63 alternately forwardly and rearwardly to rotate the crank shaft 34, the sprocket wheel 36 will be caused to rotate. A driven sprocket wheel 65 is keyed to the front wheel 25; and, an endless drive member or chain 66 may be trained about both the lower and upper sprocket wheels 36 and 65 to drive the latter upon rotation of the former. In addition to back and forth motion of the hand actuable member 63 to effect front wheel driving action, the hand grip members also serve to steer the front wheel by rotation of the fork 22 in its journal tube 21.

As mentioned hereinbefore, the crank arms 41 may be arranged to extend in general parallelism with each other from opposite ends of the crank shaft 34, in which case the hand grips 63 would move simultaneously forwardly and rearwardly to effect the front wheel driving motion. Of course, other relative crank arm positions may be selected, if desired.

It will be appreciated that the movement of each hand is through a generally figure eight shaped path, as defined by back and forth movement of the hand grips 63 during sliding movement of the crossheads 58 in the guides 50 as the latter rotate back and forth. This hand movement produces a highly beneficial exercising effect for increased musculature, and further serves to improve the operator's skill and coordination. Relative hand movement may be varied by changing relative crank arm positions.

Although the present invention has been described in some detail by way of illustration and example for purposes of clarity of understanding, it is understood that certain changes and modifications may be made within the spirit of the invention.

What is claimed is:

1. A drive mechanism comprising a rotary crank shaft, a pair of crank arms extending radially from said crank shaft, a crank pin extending from each crank arm generally parallel to said crank shaft, a pair of guides mounted for rotary oscillation about an axis spaced radially from said crank shaft, a pair of connecting rods each pivotally connected at one region to a respective crank pin for rotation therewith, a pair of crossheads each shiftable on and rotatable with a respective guide and secured to a respective connecting rod at a location spaced from said one region thereof, and operator actuating means connected to each of said crossheads for shifting and rotating the latter on its associated guide to rotate said crank pins and drive said crank shaft, whereby said actuating means move in a figure eight path for multiple muscle toning of the operator.

2. A drive mechanism according to claim 1, said guides each comprising a guide bar fixed relative to the axis of said crank shaft, and an elongated way means transverse to and rotatable about the axis of its guide bar, each crosshead being shiftable on a respective way means and rotatable with its way means about the axis of the associated guide bar.

3. A drive mechanism according to claim 1, said crank arms extending in opposite directions from said crank shaft, whereby said crossheads and their actuating means move in oppositely directed figure eight paths on respective guides for enhancing coordination of an operator.

4. A drive mechanism according to claim 1, said crank arms extending in generally the same direction from said crank shaft, whereby said crossheads and their actuating means move in the same general direction on respective guides.

5. A drive mechanism according to claim 1, said one connecting rod regions each being at one end of the respective connecting rod, and said crossheads each being fixed to the other end of its respective connecting rod.

6. A drive mechanism according to claim 1, in combination with a wheeled vehicle, said crank shaft being connected in driving relation with a wheel of said vehicle.

7. A drive mechanism according to claim 6, said actuating means comprising hand grips for hand actuation.

* * * * *